United States Patent
Zhang et al.

(10) Patent No.: US 9,237,564 B2
(45) Date of Patent: Jan. 12, 2016

(54) ENHANCED RECONFIGURATION PROCEDURE AT A MOBILE TERMINAL TO REDUCE SIGNALING AND POWER CONSUMPTION OVERHEAD

(71) Applicant: QUALCOMM Incorporated, San Diego, CA (US)

(72) Inventors: Yi Zhang, San Diego, CA (US); Sitaramanjaneyulu Kanamarlapudi, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 14/079,165

(22) Filed: Nov. 13, 2013

(65) Prior Publication Data

US 2014/0313987 A1  Oct. 23, 2014

Related U.S. Application Data

(60) Provisional application No. 61/812,821, filed on Apr. 17, 2013.

(51) Int. Cl.
*H04W 72/04* (2009.01)
*H04L 1/00* (2006.01)
(Continued)

(52) U.S. Cl.
CPC ............. *H04W 72/0413* (2013.01); *H04L 1/00* (2013.01); *H04W 52/0216* (2013.01); *H04W 76/046* (2013.01); *Y02B 60/50* (2013.01)

(58) Field of Classification Search
CPC ............... H04L 1/00; H04W 52/0216; H04W 72/0413; H04W 76/046; Y02B 60/50

USPC .......................................... 370/310, 328, 329
See application file for complete search history.

(56) References Cited

U.S. PATENT DOCUMENTS 7,068,636 B2  6/2006  Kuo et al.
7,894,444 B2  2/2011  Lohr et al.
(Continued)

FOREIGN PATENT DOCUMENTS

EP        2028894 A1      2/2009
WO   WO-2008133470 A1   11/2008
(Continued)

OTHER PUBLICATIONS

3GPP: "3GPP TS 25.331 v11.5.0 (Mar. 2013) 3rd Generation Partnership Project;Technical Specification Group Radio Access Network; Radio Resource Control (RRC); Protocol specification(Release 11)", Mar. 8, 2013, p. 1,2, 167-258, XP002728697,Retrieved from the Internet:URL:http://www.3gpp.org/DynaReport/25331.htm [retrieved on Aug. 20, 2014].
(Continued)

*Primary Examiner* — Chi H Pham
*Assistant Examiner* — Robert Lopata
(74) *Attorney, Agent, or Firm* — Loza & Loza LLP

(57) ABSTRACT

Aspects of the disclosure provide a solution that a user equipment (UE) can avoid unnecessary transmission of uplink radio link control (RLC) protocol data units (PDUs) and transition between Radio Resource Control states in a Universal Mobile Telecommunications System (UMTS) network, thereby reducing signaling and power consumption overhead and latency at the UE.

27 Claims, 10 Drawing Sheets

(51) Int. Cl.
*H04W 76/04* (2009.01)
*H04W 52/02* (2009.01)

(56) References Cited

U.S. PATENT DOCUMENTS

| | | | |
|---|---|---|---|
| 7,925,233 B2* | 4/2011 | Wu | 455/226.2 |
| 2007/0014274 A1* | 1/2007 | Choi | 370/349 |
| 2010/0279679 A1 | 11/2010 | Young et al. | |
| 2012/0163313 A1* | 6/2012 | Jung et al. | 370/329 |
| 2012/0184278 A1* | 7/2012 | Chin et al. | 455/438 |
| 2013/0122918 A1* | 5/2013 | Boley et al. | 455/450 |
| 2013/0150062 A1 | 6/2013 | Pani et al. | |
| 2014/0274083 A1* | 9/2014 | Sheik et al. | 455/450 |
| 2014/0295871 A1* | 10/2014 | Ahn et al. | 455/452.1 |
| 2014/0323135 A1* | 10/2014 | Yang et al. | 455/438 |
| 2014/0362826 A1* | 12/2014 | Chao et al. | 370/331 |

FOREIGN PATENT DOCUMENTS

| | | |
|---|---|---|
| WO | WO-2011060997 A1 | 5/2011 |
| WO | WO-2011091433 A2 | 7/2011 |

OTHER PUBLICATIONS

International Search Report and Written Opinion—PCT/US2014/018605—ISA/EPO—Sep. 15, 2014.

* cited by examiner

ENHANCED RECONFIGURATION PROCEDURE AT A MOBILE TERMINAL TO REDUCE SIGNALING AND POWER CONSUMPTION OVERHEAD

CROSS-REFERENCE TO RELATED APPLICATIONS

This application claims priority to and the benefit of provisional patent application No. 61/812,821 filed in the United States Patent Office on Apr. 17, 2013, the entire content of which is incorporated herein by reference.

TECHNICAL FIELD

Aspects of the present disclosure relate generally to wireless communication systems, and more particularly, to signaling control of reconfiguration procedures at a mobile terminal.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In the UMTS standards, a physical channel reconfiguration procedure is used to establish, reconfigure, and release physical channels between a user equipment (UE) (also referred to as a mobile station, wireless terminal, mobile terminal, etc.) and a UMTS Terrestrial radio access network (UTRAN). (See 3GPP Technical Specification 25.331 for more information). The control signaling between the UE and UTRAN (the network) can be carried out using radio resource control (RRC) messages. RRC messages carry all parameters required to set up, modify and release layer 2 and layer 1 protocol entities. Referring to FIG. 1, to initiate the physical channel reconfiguration procedure, a UTRAN 102 transmits a Physical Channel Reconfiguration message 104 on a downlink dedicated control channel (DCCH) using acknowledged mode (AM) or unacknowledged mode (UM) Radio Link Control (RLC) signaling. In response, a UE 106 returns a Physical Channel Reconfiguration Complete message 108 if reconfiguration is successful.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure provide a solution that a user equipment can avoid unnecessary transmission of uplink radio link control (RLC) protocol data units (PDUs) and transition between Radio Resource Control states in a wireless communication network, thereby reducing signaling and power consumption overhead and latency at the user equipment.

In one aspect, the disclosure provides a method of reconfiguring one or more physical channels at a user equipment (UE) in a wireless communication network. The UE receives a reconfiguration message from a network for reconfiguring UE from a first radio resource control (RRC) state to a second RRC state. The UE transmits a reconfiguration complete message indicative of a transition of the UE to the second RRC state. The UE receives a first acknowledgement from the network acknowledging the reconfiguration complete message. After the reception of the first acknowledgement, the UE cancel a pending radio link control (RLC) acknowledgement (ACK) protocol data unit (PDU).

Another aspect of the disclosure provides an apparatus for wireless communication. The apparatus includes means for receiving a reconfiguration message from a network for reconfiguring the apparatus from a first radio resource control (RRC) state to a second RRC state. The apparatus further includes means for transmitting a reconfiguration complete message indicative of a transition of the apparatus to the second RRC state. The apparatus further includes means for receiving a first acknowledgement from the network acknowledging the reconfiguration complete message. The apparatus further includes after the reception of the first acknowledgement, means for cancelling a pending radio link control (RLC) acknowledgement (ACK) protocol data unit (PDU).

Another aspect of the disclosure provides an apparatus for wireless communication. The apparatus includes at least one processor, a communication interface coupled to the at least one processor, and a memory coupled to the at least one processor. The at least one processor includes a number of circuitries configured to perform various functionalities. A first circuitry of the processor is configured to receive a reconfiguration message from a network for reconfiguring the apparatus from a first radio resource control (RRC) state to a second RRC state. A second circuitry of the processor is configured to transmit a reconfiguration complete message indicative of a transition of the apparatus to the second RRC state. A third circuitry of the processor is configured to receive a first acknowledgement from the network acknowledging the reconfiguration complete message. After the reception of the first acknowledgement, a fourth circuitry of the processor is configured to cancel a pending radio link control (RLC) acknowledgement (ACK) protocol data unit (PDU).

Another aspect of the disclosure provides a computer-readable storage medium include code for causing a user equipment (UE) to perform various functions. The code causes the UE to receive a reconfiguration message from a network for reconfiguring the UE from a first radio resource control (RRC) state to a second RRC state. The code causes the UE to transmit a reconfiguration complete message indicative of a transition of the UE to the second RRC state. The code causes the UE to receive a first acknowledgement from the network acknowledging the reconfiguration complete message. After the reception of the first acknowledgement, the code causes the UE to cancel a pending radio link control (RLC) acknowledgement (ACK) protocol data unit (PDU).

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure provide a solution that a user equipment (UE) can avoid unnecessary transmission of uplink (UL) radio link control (RLC) protocol data units (PDUs) and transition between Radio Resource Control states in a UMTS network, thereby reducing signaling and power consumption overhead and latency at the UE. While the various aspects of the disclosure will be illustrated below using a UMTS network, it will be appreciated that the concepts and scope of the present disclosure is not limited to the UMTS standards.

Figure 2:
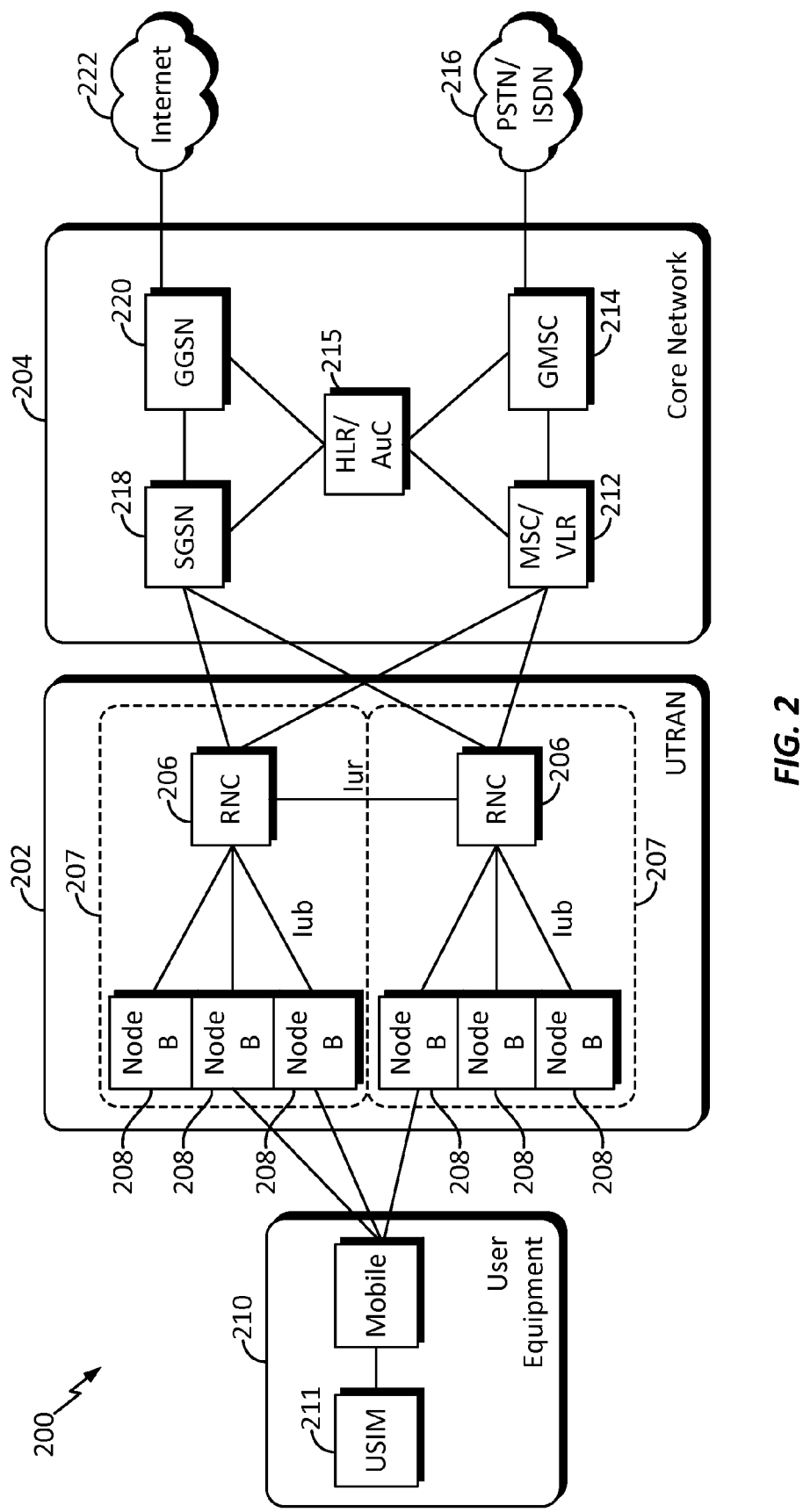
FIG. 2 is a block diagram conceptually illustrating an example of a UMTS telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. The UTRAN 202 may be the UTRAN 102, and the UE 210 may be the UE 106. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 3:
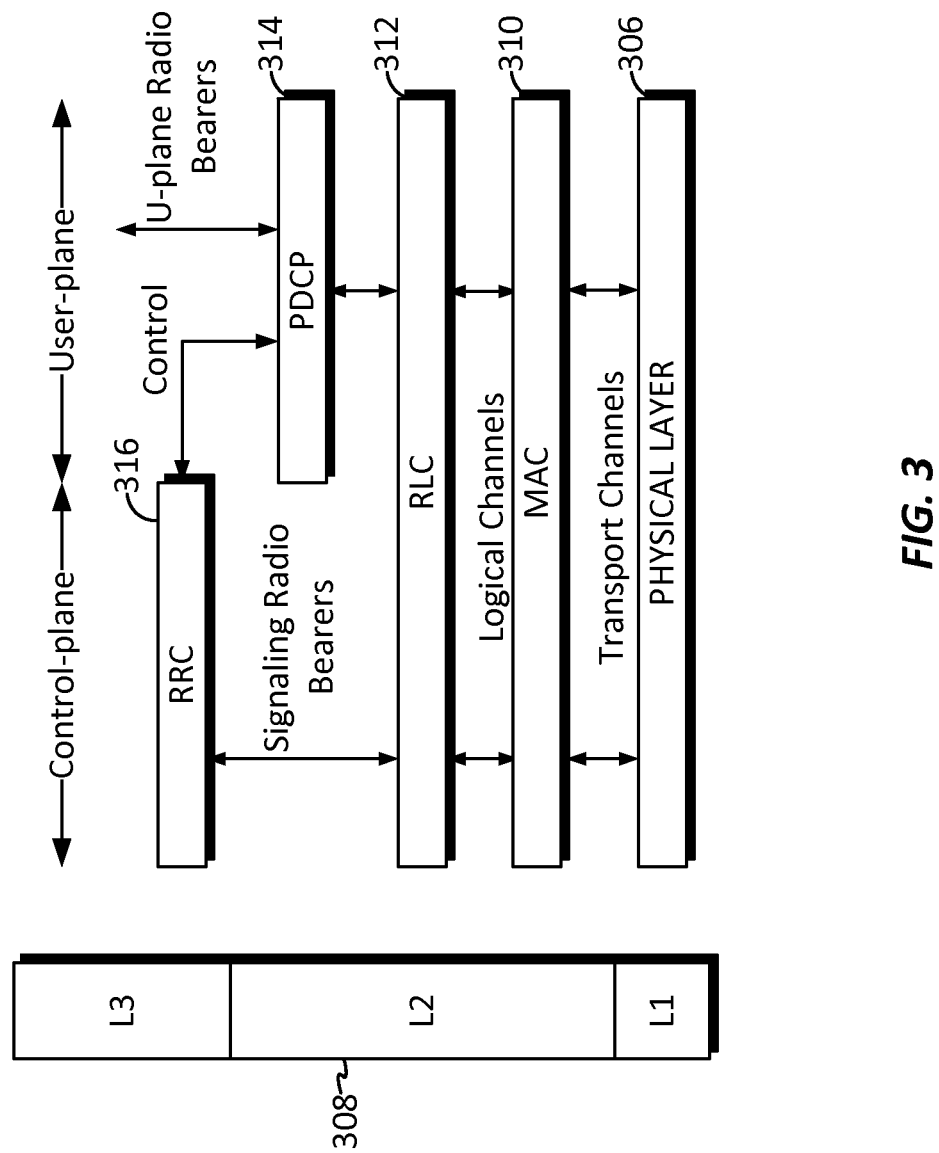
FIG. 3 is a conceptual diagram illustrating an example of a radio protocol architecture for the user and control plane in the UMTS standards.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between the UE 210 and Node B 208 over the physical layer 306.

At Layer 3, the RRC layer 316 handles the control plane signaling between the UE 210 and the Node B 208. RRC layer 316 includes a number of functional entities for routing higher layer messages, handling broadcasting and paging functions, establishing and configuring radio bearers, physical channel reconfiguration, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

Figure 4:
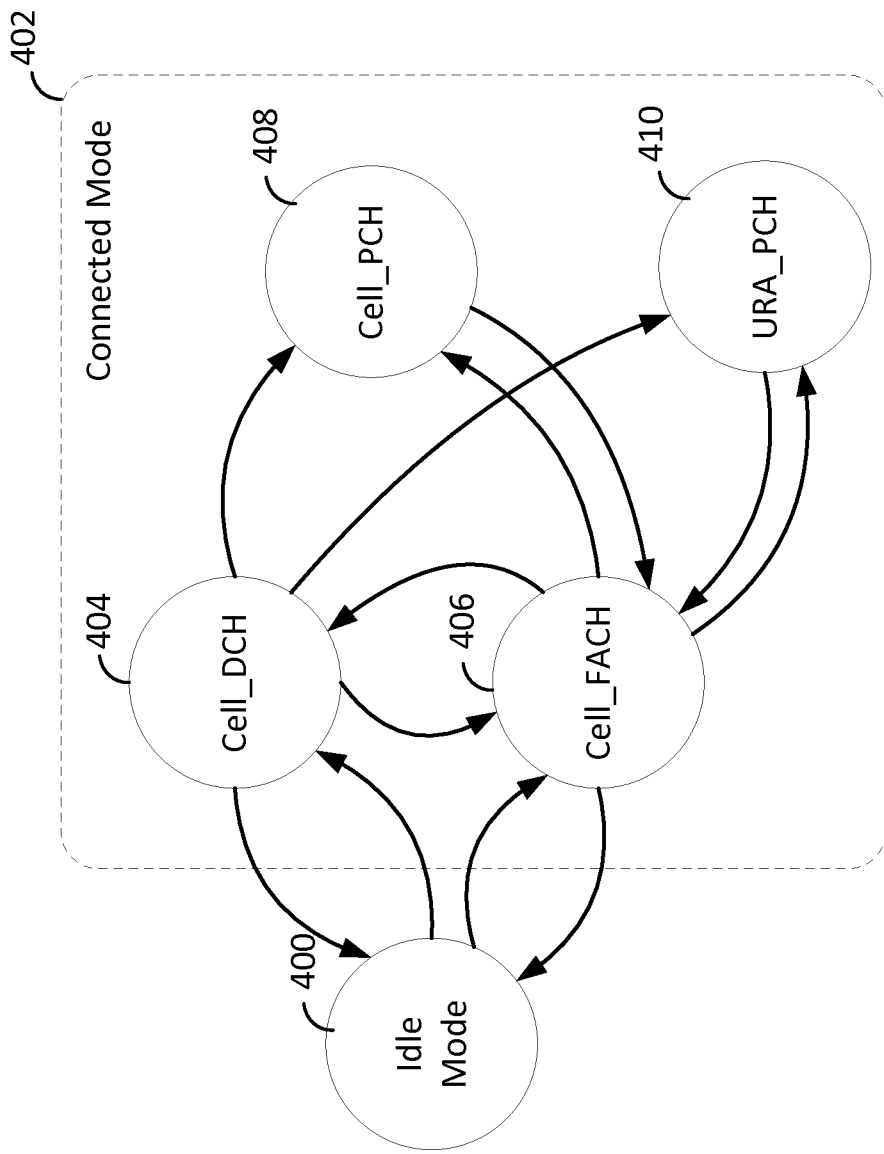
FIG. 4 is a state diagram illustrating the operational modes of a user equipment in a UMTS network.

FIG. 4 is a state diagram illustrating the operational modes of the UE 210 in, for example, the UMTS network 200 as described above. Two basic operational modes of the UE 210 are idle mode and connected mode. The connected mode can be further divided into a number of service states, which define what kind of physical channels the UE 210 is using. FIG. 4 shows the main RRC service states in the connected mode. It also shows the transitions between an idle mode 400 and a connected mode 402 and the possible transitions within the connected mode. In the idle mode 400, the UE 210 is able to receive system information and cell broadcast (CB) messages. The UE 210 stays in the idle mode 400 until it transmits a request to establish an RRC connection. In the idle mode 400, the UTRAN 202 has no information of its own about the individual idle-mode UEs and can only address, for example, all UEs in a cell or all UEs monitoring a paging occasion.

In the connected mode 402, the UE 210 may be in one of a Cell_DCH state 404, a Cell_FACH state 406, a Cell PCH_state 408, and a URA_PCH state 410. In the Cell_DCH state 404, a dedicated physical channel is allocated to the UE 210, and the UE 210 is known by its serving RNC on a cell or active set level. In the Cell_FACH state 406, no dedicated physical channel is allocated for the UE 210, but random access channels (RACHs) and forward access channels (FACHs) are used instead, for transmitting both signaling messages and small amounts of user-plane data. The UE's power consumption is typically less in the Cell_FACH state 406 than that of the Cell_DCH state 404.

In the Cell_PCH state 410, the UE 210 is still known on a cell level in the serving RNC (SRNC), but it can be reached only via the paging channel (PCH). In this state, the UE's battery consumption is less than that of the Cell_DCH state 404 and/or the Cell_FACH state 406 since the monitoring of the PCH includes a discontinuous reception (DRX) functionality. If the UE 210 performs a cell reselection, then it moves autonomously to the Cell_FACH state 406 to execute the Cell Update procedure, after which it re-enters the Cell_PCH state 410 if no other activity is triggered during the Cell Update procedure. If a new cell is selected from another radio access system, then the RRC state is changed to the idle mode 400, and access to the other system is performed according to that system's specifications.

The URA_PCH state 410 is very similar to the Cell_PCH state 408, except that the UE 210 does not execute Cell Update after each cell reselection, but instead reads UTRAN Registration Area (URA) identities from the BCH, and only if the URA changes (after cell reselection) does the UE 210 inform its location to the SRNC. The power consumption of the UE 210 is typically less in the URA_PCH state 408 than that of the Cell_DCH state 404 and/or the Cell_FACH state 406.

The UE 210 leaves the connected mode and returns to the idle mode 400 when the RRC connection is released or at RRC connection failure. Transitioning the UE 210 among the above states involves exchanging control messages on the control channels. For example, the UE 210 can send a signaling connection release indication (SCRI) to the RNC 206. Based on the values of the received SCRI, the RNC 206 may command the UE 210 to use the Cell_PCH state 408 or the URA_PCH state 410, instead of releasing the RRC connection and dropping the UE 210 into the idle mode 400. In another example, the RNC 206 can command the UE 210 to drop to the idle mode 400 directly from the Cell_DCH state 404.

In the idle mode 400, the UE 210 can transition to the Cell_DCH state 404 or Cell_FACH state 406. This transition from the idle mode 400 is initiated by an RRC connection request. This step involves setting up the necessary radio access bearers (RABs). Transitions from the Cell_FACH state 406 or Cell_DCH state 404 to the Cell_PCH state 408 involves tearing down radio access bearers that have been allocated. A transition from the Cell_DCH state 404 to the Cell_FACH state 406 involves withdrawing the power and code allocated. When the UE 210 is in the Cell_DCH state 404, the UE 210 consumes more energy than the other states to keep the connection going in the DCH state.

In many wireless networks (e.g., UMTS), a connection can be transitioned from the Cell_DCH state 404 to the Cell_FACH state 406 to reduce power consumption under certain conditions, but data throughput in the Cell_FACH state 406 is lower than that of the Cell_DCH state 404. However, the amount of energy required on the UE's side can still be significant in the Cell_FACH state 406. Therefore, the UE 210 can be transitioned from the Cell_DCH state 404 and Cell_FACH 406 to an even lower energy consuming state, such as the Cell_PCH state 408, the URA_PCH state 410, or back to the idle mode 400.

RRC reconfiguration procedures can be used to change the UE state, for example, from the Cell_PCH state to the Cell_FACH state and vice versa. RRC reconfiguration procedures include the radio bearer establishment procedure, radio bearer reconfiguration procedure, the radio bearer release procedure, the transport channel reconfiguration procedure, and the physical channel reconfiguration procedure. The physical channel reconfiguration procedure is used to establish, reconfigure, and release physical channels.

The radio bearer establishment procedure is used to establish new radio bearer(s). The radio bearer reconfiguration procedure is used to reconfigure parameters for a radio bearer. The radio bearer release procedure is used to release radio bearer(s). The transport channel reconfiguration procedure is used to reconfigure transport channel parameters. The physical channel reconfiguration procedure is used to establish, reconfigure, and release physical channels.

The 3GPP Specification Release 7 and Release 8 introduced the Enhanced Cell_FACH state to improve the end user performance and system efficiency by utilizing HSPA transport and physical channels in the Cell_FACH state. The state transition from Enhanced Cell_FACH (hereafter may be referred to as "Cell_FACH") to Cell_DCH is practically seamless because the physical channel is not changed. In the Cell_FACH state, the E-DCH transport channel is used for uplink transmission. E-DCH resources and initial data rate allocation to be used in the Cell_FACH state are broadcast to the cell.

Figure 5:
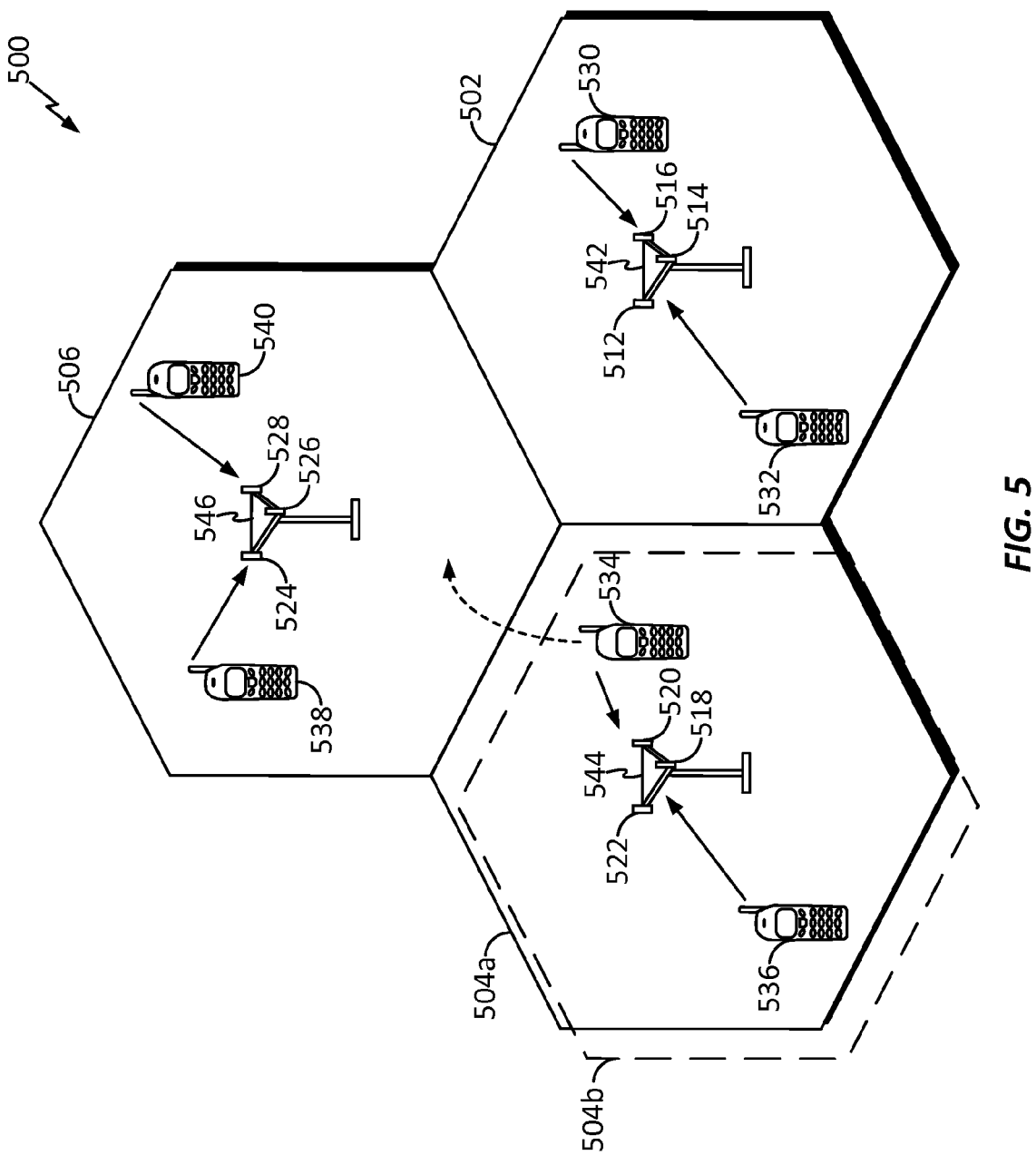
FIG. 5 is a conceptual diagram illustrating an example of a UMTS access network.

The UTRAN 202 is one example of a RAN that may be utilized in accordance with the present disclosure. Referring to FIG. 5, by way of example and without limitation, a simplified schematic illustration of a RAN 500 in a UTRAN architecture is illustrated. The system includes multiple cellular regions (cells), including cells 502, 504, and 506, each of which may include one or more sectors. Cells may be defined geographically (e.g., by coverage area) and/or may be defined in accordance with a frequency, scrambling code, etc. That is, the illustrated geographically-defined cells 502, 504, and 506 may each be further divided into a plurality of cells, e.g., by utilizing different scrambling codes. For example, cell 504a may utilize a first scrambling code, and cell 504b, while in the same geographic region and served by the same Node B 544, may be distinguished by utilizing a second scrambling code.

In a cell that is divided into sectors, the multiple sectors within a cell can be formed by groups of antennas with each antenna responsible for communication with UEs in a portion of the cell. For example, in cell 502, antenna groups 512, 514, and 516 may each correspond to a different sector. In cell 504, antenna groups 518, 520, and 522 may each correspond to a different sector. In cell 506, antenna groups 524, 526, and 528 may each correspond to a different sector.

The cells 502, 504, and 506 may include several UEs that may be in communication with one or more sectors of each cell 502, 504, or 506. For example, UEs 530 and 532 may be in communication with Node B 542, UEs 534 and 536 may be in communication with Node B 544, and UEs 538 and 540 may be in communication with Node B 546. Here, each Node B 542, 544, and 546 may be configured to provide an access point to a core network 204 (see FIG. 2) for all the UEs 530, 532, 534, 536, 538, and 540 in the respective cells 502, 504, and 506.

During a call with a source cell, or at any other time, the UE 536 may monitor various parameters of the source cell as well as various parameters of neighboring cells. Further, depending on the quality of these parameters, the UE 536 may maintain communication with one or more of the neighboring cells. During this time, the UE 536 may maintain an Active Set, that is, a list of cells to which the UE 536 is simultaneously connected (i.e., the UTRAN cells that are currently assigning a downlink dedicated physical channel DPCH or fractional downlink dedicated physical channel F-DPCH to the UE 536 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 6:
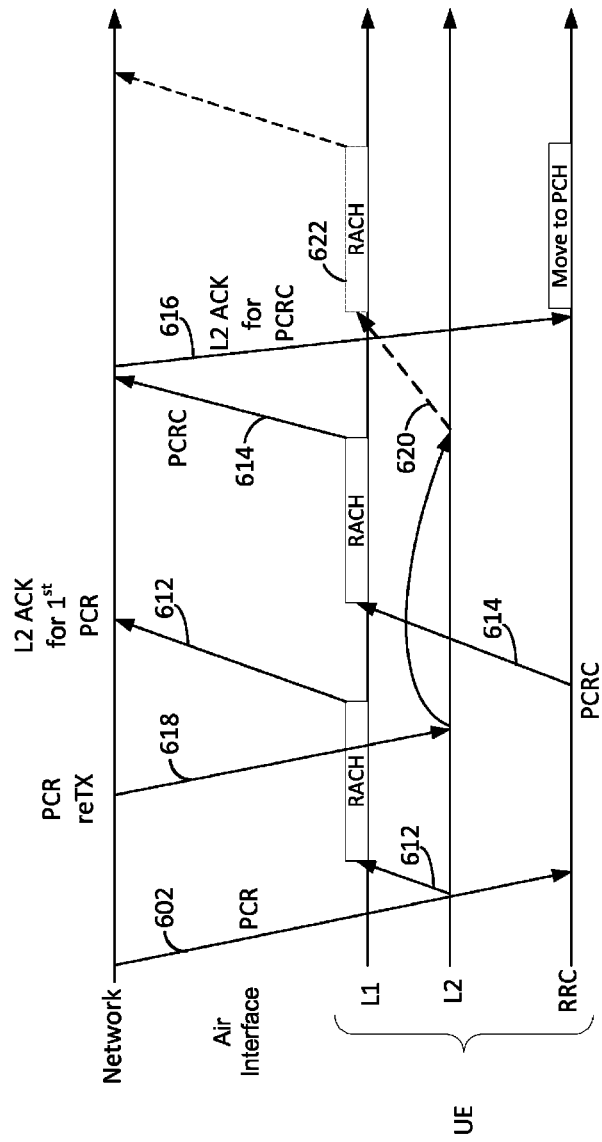
FIG. 6 is a message flow diagram illustrating a physical channel reconfiguration procedure between a user equipment and a UMTS network in accordance with an aspect of the disclosure.

In one example, the UE 210 is in the Cell_FACH state 406, and the network (e.g., UTRAN 202) may instruct the UE 210 to move to the Cell_PCH state 408 through a Physical Channel Reconfiguration (PCR) procedure illustrated in the message flow diagram of FIG. 6. The network sends a Physical Channel Reconfiguration (PCR) message 602 to the UE 210. At the UE side, if the PCR message 602 in the downlink (DL) is received by an AM-RLC entity of the UE, the RLC entity will transmit a Layer 2 Acknowledgement (L2 ACK) 612 for each of the DL PDUs carrying the PCR message 602. In response to the PCR message 602, an AM entity of the UE transmits a Physical Channel Reconfiguration Complete (PCRC) message 614 for which the network sends an L2 ACK 616 for the PCRC 614. In this example, the L2 ACK 612 and PCRC 614 are transmitted via a random access channel (RACH) procedure.

On receiving the L2 ACK 616 at the UE, it is assumed that the PCRC message 614 is completely received by the network at the RRC level, and the UE's RRC entity will start configuring its layer 1 (L1) to move into the Cell_PCH state. If the reconfiguration procedure is initiated in the Cell_FACH state, the L2 ACK 612 is transmitted to the network by using an RACH procedure, which might take a variable amount of time based on the radio channel conditions between the UE and network. Therefore, it is possible that there might be a retransmission (reTx) 618 of PDUs carrying the PCR message in the DL. This retransmission of PCR PDU will be discarded by the UE because the PCRC message 614 is already considered complete at the UE's RRC level (i.e., L2 ACK 616 already received by the UE). Notwithstanding, the UE will transmit an L2 ACK for the retransmitted PDU 618 of the PCR message according to the standard procedure in the related art.

At the UE, if there is any uplink RLC ACK PDU 620 (e.g., L2 ACK for PCR reTx 618) pending, which is only known at the RLC/MAC level, the RRC of the UE will continue configuring its Layer 1 to the Cell_PCH state to complete the reconfiguration. After the UE moves to the Cell_PCH state, its RLC entity will indicate to the RRC entity that there is RLC data (e.g., L2 ACK 620) pending for UL transmission. This will trigger the RRC entity to move the UE back to the Cell_FACH state in order to send the pending RLC data via a RACH procedure 622. However, this scenario causes undesirable additional transitions from the Cell PCH state to the Cell_FACH state and then back to the Cell_PCH state. This causes additional signaling and power consumption overhead without performing any useful functions at the UE.

Accordingly, aspects of the present disclosure provide a solution wherein a UE can reduce or avoid unnecessary retransmission of pending uplink RLC PDUs (e.g., L2 ACK 620) and unnecessarily transitioning the UE between different RRC states (e.g., between the Cell_PCH state and Cell_FACH state). Therefore, power consumption and signaling overhead and latency at the UE may be reduced or avoided.

In an aspect of the disclosure, on the UE side, upon receiving an RLC ACK 616 from the network acknowledging the PCRC message 614 in the PCR procedure of FIG. 6, any further pending uplink RLC ACK PDUs (e.g., L2 ACK 620) for any DL RLC PDUs related to the already-completed PCR message 602 can be ignored, and the RLC buffers of control PDU of the UE can be cleared. In other words, the pending RLC ACK PDUs are cancelled or deleted at the UE. Additionally, on the UE side, if there is any ongoing RACH procedure 622 for the transmission of the pending uplink L2 ACK PDUs, this RACH procedure 622 can be aborted.

Figure 7:
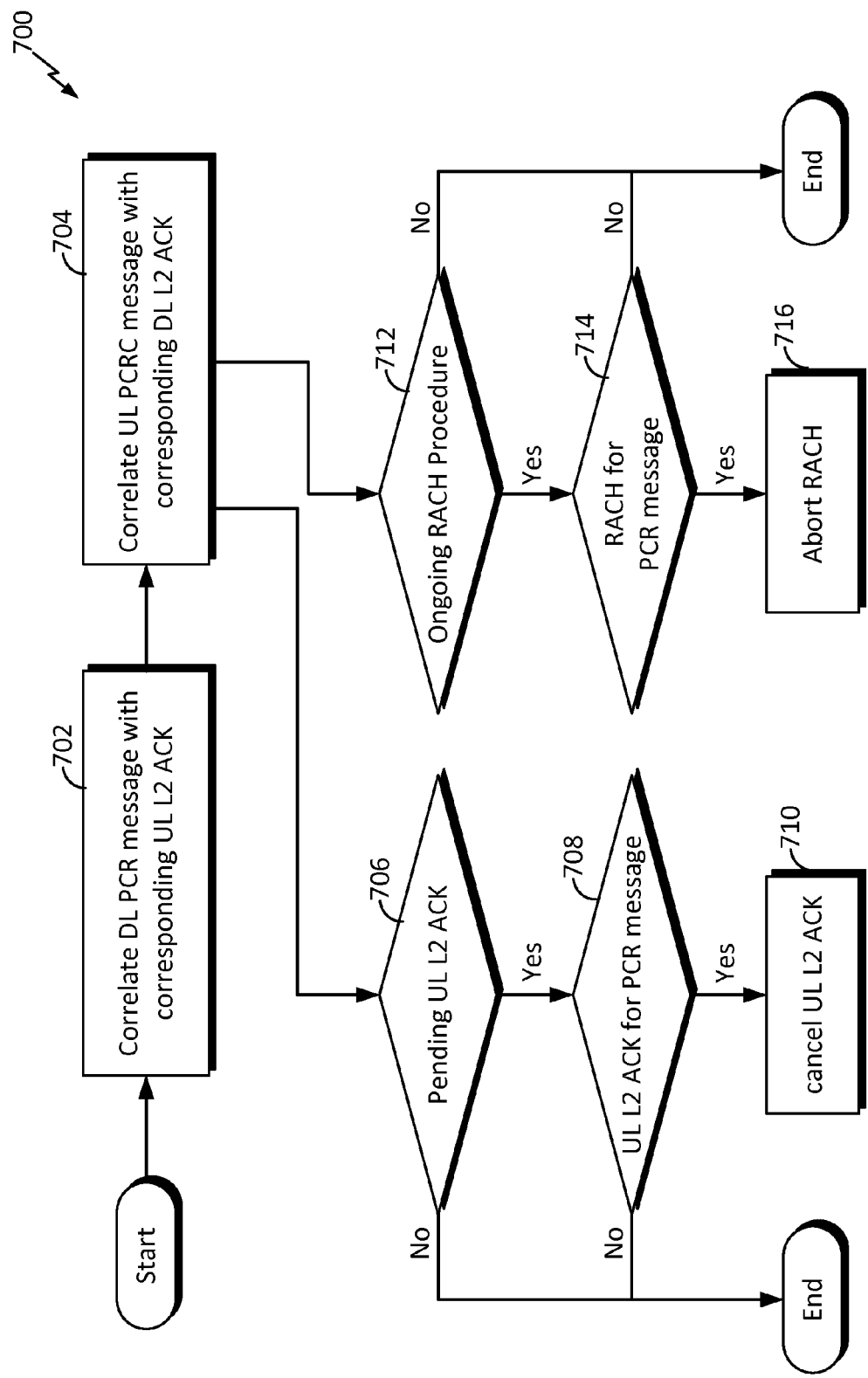
FIG. 7 is a flowchart illustrating a procedure of physical channel reconfiguration operable at a user equipment in a UMTS network in accordance with an aspect of the disclosure.

FIG. 7 is a flowchart illustrating a procedure 700 of physical channel reconfiguration operable at a UE in accordance with an aspect of the disclosure. The procedure 700 may be operated at the UE 210 that may be implemented as an apparatus 800 (see FIG. 8) that will be described in more detail below. In step one 702, the UE correlates the downlink PCR message 602 with a corresponding uplink L2 ACK 612. That is, the UE recognizes that the L2 ACK 612 is a successful response to the PCR message 602. In step two 704, the UE correlates the uplink PCRC message 614 with a corresponding downlink L2 ACK 616 acknowledging the PCRC message. That is, the UE recognizes that the L2 ACK 616 is a successful response to the PCRC message 614. Step one 702 and step two 704 may be performed in different orders or simultaneously. In step three 706, the UE determines whether or not an uplink L2 ACK PDU is pending. In step four 708, the UE determines whether or not the pending uplink L2 ACK PDU is for acknowledging the PCR message 602. In step five 710, the UE cancels the pending L2 ACK PDU (e.g., L2 ACK 620) if it is for the PCR message 602. Accordingly, based on the correlations made in steps one and two, the UE can determine and cancel any pending uplink RLC ACK PDU (e.g., L2 ACK 620) for the PCR message 602 in steps three to five. The pending L2 ACK 620 is not necessary and cancelled because the L2 ACK 616 acknowledging the PCRC message 614 has already been successfully received and executed by the UE. In some aspects of the disclosure, the L2 ACK 616 may be referred to as the first acknowledgement, and the L2 ACK 612 may be referred to as the second acknowledgement.

In step six 712, the UE determines whether or not an uplink RACH procedure is ongoing. In step seven 714, the UE determines whether or not the ongoing RACH procedure is for retransmitting an uplink L2 ACK PDU acknowledging the PCR message 602. In step eight 716, the UE aborts the ongoing RACH procedure for transmitting the pending L2 ACK PDU acknowledging the PCR message 602. Accordingly, based on the correlations made in steps one and two, the UE can determine and abort any ongoing uplink RACH procedure for the transmission of any pending uplink RLC ACK PDU acknowledging the PCR message 602 in steps six to eight. The ongoing RACH procedure for transmitting the L2 ACK acknowledging the PCR message 602 is not necessary and aborted because the L2 ACK 616 for the PCRC message 614 has already been successfully received and executed by the UE.

Figure 1:
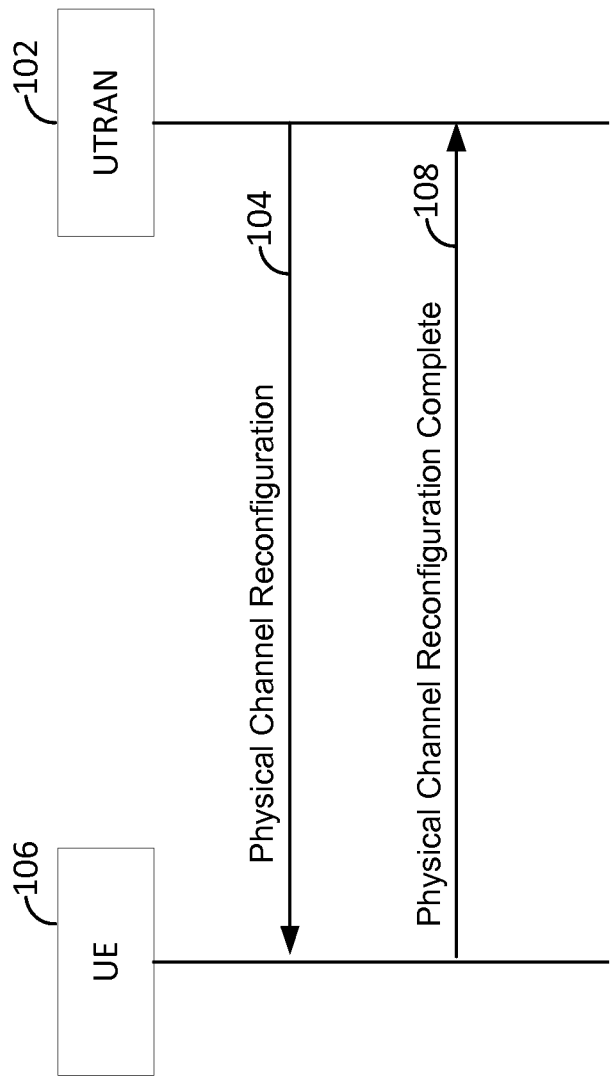
FIG. 1 is a conceptual diagram illustrating a physical channel reconfiguration procedure between a user equipment and a UMTS Terrestrial radio access network.
Figure 8:
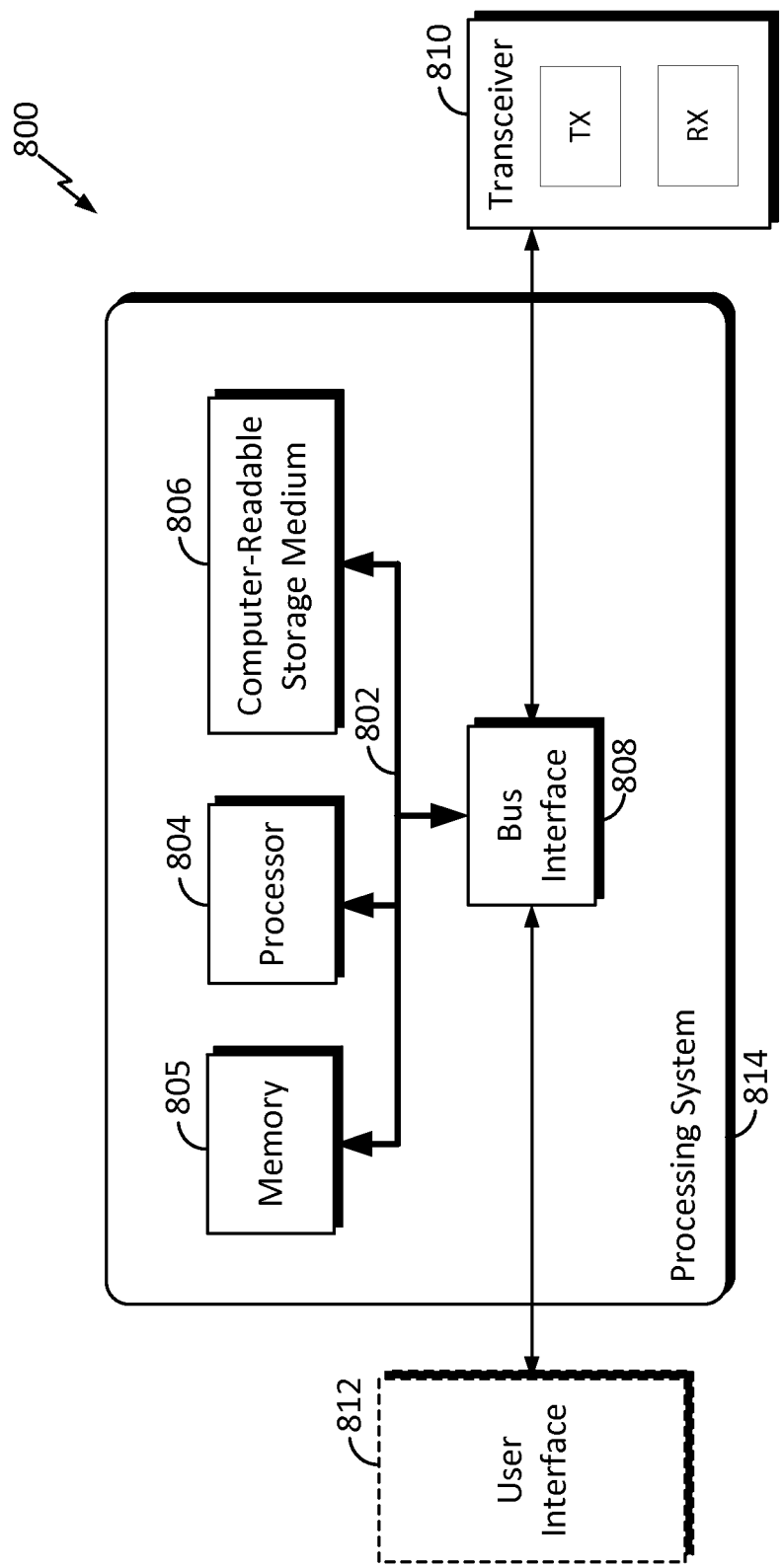
FIG. 8 is a block diagram illustrating an example of a hardware implementation for an apparatus employing a processing system.

FIG. 8 is a conceptual diagram illustrating an example of a hardware implementation for an apparatus 800 employing a processing system 814. In accordance with various aspects of the disclosure, an element, or any portion of an element, or any combination of elements may be implemented with a processing system 814 that includes one or more processors 804. For example, the apparatus 800 may be a user equipment (UE) as illustrated in any one or more of FIGS. 1, 2, 5, and/or 6. In another example, the apparatus 800 may be a radio network controller (RNC) as illustrated in any one or more of FIGS. 2 and/or 5. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 804, as utilized in an apparatus 800, may be used to implement any one or more of the processes described and illustrated in FIGS. 1, 6 and 7.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable storage medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver includes one or more transmitters and receivers that may be unitary or separate. The transceiver 810 is a communication interface that provides a means for communicating with various other apparatus over a transmission medium. Depending upon the nature of the apparatus, a user interface 812 (e.g., keypad, display, speaker, microphone, joystick, touchpad, touchscreen) may also be provided.

Figure 9:
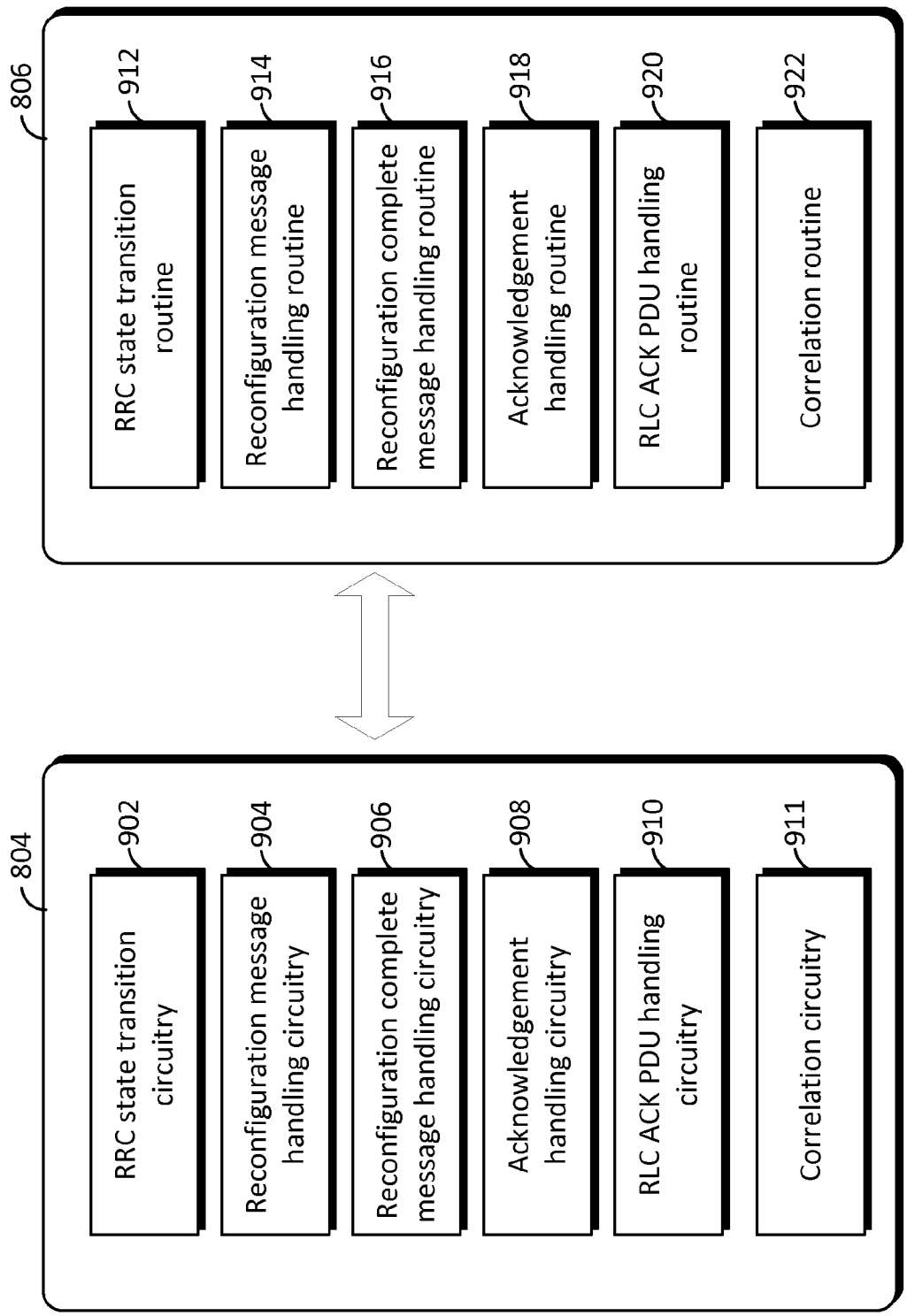
FIG. 9 is a conceptual diagram illustrating a processor and a computer-readable storage medium of FIG. 8 in more detail according to an aspect of the disclosure.

FIG. 9 is a conceptual diagram illustrating the processor 804 and computer-readable storage medium 806 in more detail according to an aspect of the disclosure. The processor 804 includes RRC state transition circuitry 902, reconfiguration message handling circuitry 904, reconfiguration complete message handling circuitry 906, acknowledgement handling circuitry 908, RLC ACK PDU handling circuitry 910 and correlation circuitry 911. The computer-readable storage medium 806 includes an RRC state transition routine 912, a reconfiguration message handling routine 914, a reconfiguration complete message handling routine 916, an acknowledgement handling routine 918, an RLC ACK PDU handling routine 920, and a correlation routine 922. These circuitries and routines will be described in more detail below in reference to FIG. 10.

The processor 804 is also responsible for managing the bus 802 and general processing, including the execution of software stored on the computer-readable storage medium 806. The software, when executed by the processor 804, causes the processing system 814 to perform the various functions described in the figures for any particular apparatus. The computer-readable storage medium 806 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 806. The computer-readable storage medium 806 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 806 may reside in the processing system 814, external to the processing system 814, or distributed across multiple entities including the processing system 814. The computer-readable storage medium 806 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

Figure 10:
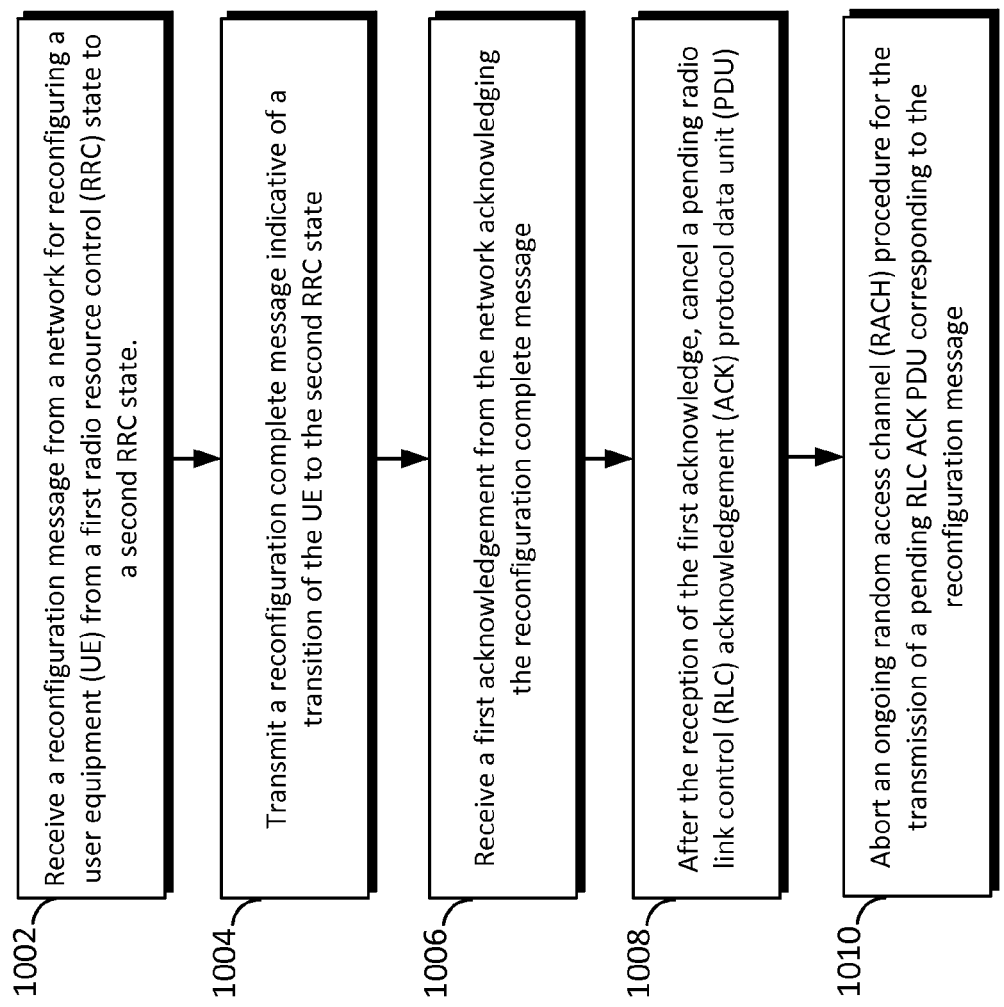
FIG. 10 is a flowchart illustrating a method of reconfiguring one or more physical channels operable at a user equipment in a UMTS network in accordance with an aspect of the disclosure.

FIG. 10 is a flowchart illustrating a method of reconfiguring one or more physical channels operable at a user equipment in a wireless communication network in accordance with an aspect of the disclosure. For example, the user equipment may be the UE 210 of FIG. 2. In a first step 1002, the UE 210 receives a reconfiguration message from a network (e.g., UTRAN 202) for reconfiguring the UE from a first radio resource control (RRC) state to a second RRC state. For example, the processor 804 of the UE may execute the reconfiguration message handling routine 914 to configure the reconfiguration message handling circuitry 904 to receive and process the PCR message 602 from the network. Also, the processor 804 may execute the RRC state transition routine 912 to configure the RRC state transition circuitry 902 to transition the UE from a Cell_FACH state to a Cell_PCH state.

In a second step 1004, the UE further transmits a reconfiguration complete message indicative of a transition of the UE to the second RRC state. For example, in response to the PCR message 602, the processor 804 of the UE may execute the reconfiguration complete message handling routine 916 to configure the reconfiguration complete message handling circuitry 906 to transmit the PCRC message 614 to the network. The PCRC message 614 indicates that the UE has transitioned to the second RRC state (e.g., Cell_PCH state).

In a third step 1006, the UE further receives a first acknowledgement from the network acknowledging the reconfiguration complete message. For example, the processor 804 of the UE may execute the acknowledgement handling routine 918 to configure the acknowledgement handling circuitry 908 to receive the L2 ACK 616 (the first acknowledgement) acknowledging the PCRC message 614. In a fourth step 1008, the UE after the reception of the first acknowledgement, cancel a pending radio link control (RLC) acknowledgement (ACK) protocol data unit (PDU). For example, the processor 804 of the UE may execute the RLC ACK PDU handling routine 920 to configure the RLC ACK PDU handling circuitry 910 to cancel the L2 ACK PDU 620 from an RLC buffer. Furthermore, in a fifth step 1010, the RLC ACK PDU handling circuitry 910 may be configured to abort an ongoing random access channel (RACH) procedure 622 for the transmission of a pending RLC ACK PDU corresponding to the reconfiguration message.

In some aspects of the disclosure, the UE may further transmit a second acknowledgement to the network acknowledging the reconfiguration message. For example, the processor 804 of the UE may execute the acknowledgement handling routine 918 to configure the acknowledgement handling circuitry 908 to transmit the L2 ACK 612 acknowledging the PCR message 602. The UE may further correlate the reconfiguration message with the second acknowledgement such that the UE recognizes the second acknowledgement as a successful response to the reconfiguration message. For example, the processor 804 of the UE may execute the correlation routine 922 to configure the correlation circuitry 911 to correlate the PCR message 602 with the L2 ACK 612. The UE may further correlate the reconfiguration complete message with the first acknowledgement such that the UE recognizes the first acknowledgement as a successful response to the reconfiguration complete message. For example, the processor 804 of the UE may execute the correlation routine 922 to configure the correlation circuitry 911 to correlate the PCRC message 614 with the L2 ACK 616. Therefore, the UE may cancel the pending RLC ACK PDU based on the correlation.

The reconfiguration procedure described above is not restricted to transitioning the UE from the Cell_FACH state to the Cell_PCH state for a physical channel reconfiguration procedure. In other aspects of the disclosure, the disclosed mechanism in FIGS. 6, 7 and 10 can be applied to any state transitions (e.g., the target state can be CELL_PCH, URA_PCH, IDLE, etc.) due to any reconfiguration procedure.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of reconfiguring one or more physical channels at a user equipment in a wireless communication network, comprising:
    receiving a reconfiguration message from a network for reconfiguring a user equipment (UE) from a first radio resource control (RRC) state to a second RRC state;
    receiving a retransmitted protocol data unit of the reconfiguration message;
    transmitting a reconfiguration complete message indicative of a transition of the UE to the second RRC state;
    receiving a first acknowledgement from the network acknowledging the reconfiguration complete message; and
    after the reception of the first acknowledgement, cancelling a pending radio link control (RLC) acknowledgement (ACK) protocol data unit (PDU), wherein the pending RLC ACK PDU corresponds to the retransmitted protocol data unit of the reconfiguration message.

2. The method of claim 1, further comprising:
    transmitting a second acknowledgement to the network acknowledging the reconfiguration message;
    correlating the reconfiguration message with the second acknowledgement such that the UE recognizes the second acknowledgement as a successful response to the reconfiguration message; and
    correlating the reconfiguration complete message with the first acknowledgement such that the UE recognizes the first acknowledgement as a successful response to the reconfiguration complete message,
wherein the pending RLC ACK PDU is canceled based on the correlation.

3. The method of claim 1, further comprising:
after the reception of the first acknowledgement, aborting an ongoing random access channel (RACH) procedure for transmitting the pending RLC ACK PDU.

4. The method of claim 1, wherein the reconfiguration message comprises a Physical Channel Reconfiguration message.

5. The method of claim 1, wherein the first RRC state is one of a Cell_DCH state, a Cell_PCH state, a Cell_FACH state, or a URA_DCH state, and the second RRC state is another one of the Cell_DCH state, Cell_PCH state, Cell_FACH state, or URA_DCH state.

6. The method of claim 1, wherein the reconfiguration complete message comprises a Physical Channel Reconfiguration Complete message.

7. The method of claim 1, further comprising prior to receiving the first acknowledgement, transitioning the UE from the first RRC state to the second RRC state.

8. An apparatus for wireless communication, comprising:
means for receiving a reconfiguration message from a network for reconfiguring the apparatus from a first radio resource control (RRC) state to a second RRC state, and receiving a retransmitted protocol data unit of the reconfiguration message;
means for transmitting a reconfiguration complete message indicative of a transition of the apparatus to the second RRC state;
means for receiving a first acknowledgement from the network acknowledging the reconfiguration complete message; and
after the reception of the first acknowledgement, means for cancelling a pending radio link control (RLC) acknowledgement (ACK) protocol data unit (PDU), wherein the pending RLC ACK PDU corresponds to the retransmitted protocol data unit of the reconfiguration message.

9. The apparatus of claim 8, further comprising:
means for transmitting a second acknowledgement to the network acknowledging the reconfiguration message;
means for correlating the reconfiguration message with the second acknowledgement such that the apparatus recognizes the second acknowledgement as a successful response to the reconfiguration message; and
means for correlating the reconfiguration complete message with the first acknowledgement such that the apparatus recognizes the first acknowledgement as a successful response to the reconfiguration complete message,
wherein the pending RLC ACK PDU is canceled based on the correlation.

10. The apparatus of claim 8, further comprising:
after the reception of the first acknowledgement, means for aborting an ongoing random access channel (RACH) procedure for transmitting the pending RLC ACK PDU.

11. The apparatus of claim 8, wherein the reconfiguration message comprises a Physical Channel Reconfiguration message.

12. The apparatus of claim 8, wherein the first RRC state is one of a Cell_DCH state, a Cell_PCH state, a Cell_FACH state, or a URA_DCH state, and the second RRC state is another one of the Cell_DCH state, Cell_PCH state, Cell_FACH state, or URA_DCH state.

13. The apparatus of claim 8, wherein the reconfiguration complete message comprises a Physical Channel Reconfiguration Complete message.

14. The apparatus of claim 8, further comprising prior to receiving the first acknowledgement, means for transitioning the apparatus from the first RRC state to the second RRC state.

15. An apparatus for wireless communication, comprising:
at least one processor;
a communication interface coupled to the at least one processor; and
a memory coupled to the at least one processor,
wherein the at least one processor comprises:
a first circuitry configured to receive a reconfiguration message from a network for reconfiguring the apparatus from a first radio resource control (RRC) state to a second RRC state, and receive a retransmitted protocol data unit of the reconfiguration message;
a second circuitry configured to transmit a reconfiguration complete message indicative of a transition of the apparatus to the second RRC state;
a third circuitry configured to receive a first acknowledgement from the network acknowledging the reconfiguration complete message; and
after the reception of the first acknowledgement, a fourth circuitry configured to cancel a pending radio link control (RLC) acknowledgement (ACK) protocol data unit (PDU), wherein the pending RLC ACK PDU corresponds to the retransmitted protocol data unit of the reconfiguration message.

16. The apparatus of claim 15,
wherein the third circuitry is further configured to transmit a second acknowledgement to the network acknowledging the reconfiguration message;
wherein the at least one processor further comprises a correlation circuitry configured to:
correlate the reconfiguration message with the second acknowledgement such that the apparatus recognizes the second acknowledgement as a successful response to the reconfiguration message; and
correlate the reconfiguration complete message with the first acknowledgement such that the apparatus recognizes the first acknowledgement as a successful response to the reconfiguration complete message,
wherein the pending RLC ACK PDU is canceled based on the correlation.

17. The apparatus of claim 15, further comprising:
after the reception of the first acknowledgement, a fifth circuitry configured to abort an ongoing random access channel (RACH) procedure for transmitting the pending RLC ACK PDU.

18. The apparatus of claim 15, wherein the reconfiguration message comprises a Physical Channel Reconfiguration message.

19. The apparatus of claim 15, wherein the first RRC state is one of a Cell_DCH state, a Cell_PCH state, a Cell_FACH state, or a URA_DCH state, and the second RRC state is another one of the Cell_DCH state, Cell_PCH state, Cell_FACH state, or URA_DCH state.

20. The apparatus of claim 15, wherein the reconfiguration complete message comprises a Physical Channel Reconfiguration Complete message.

21. The apparatus of claim 15, wherein the at least one processor further comprises a fifth circuitry configured to, prior to receiving the first acknowledgement, transition the apparatus from the first RRC state to the second RRC state.

22. A non-transitory computer-readable storage medium comprising code for causing a user equipment to:

receive a reconfiguration message from a network for reconfiguring the user equipment (UE) from a first radio resource control (RRC) state to a second RRC state;

receive a retransmitted protocol data unit of the reconfiguration message;

transmit a reconfiguration complete message indicative of a transition of the UE to the second RRC state;

receive a first acknowledgement from the network acknowledging the reconfiguration complete message; and after the reception of the first acknowledgement, cancel a pending radio link control (RLC) acknowledgement (ACK) protocol data unit (PDU), wherein the pending RLC ACK PDU corresponds to the retransmitted protocol data unit of the reconfiguration message.

23. The computer-readable storage medium of claim 22, further comprising code for causing the UE to:

transmit a second acknowledgement to the network acknowledging the reconfiguration message;

correlate the reconfiguration message with the second acknowledgement such that the UE recognizes the second acknowledgement as a successful response to the reconfiguration message; and correlate the reconfiguration complete message with the first acknowledgement such that the UE recognizes the first acknowledgement as a successful response to the reconfiguration complete message, wherein the pending RLC ACK PDU is canceled based on the correlation.

24. The computer-readable storage medium of claim 22, further comprising:

after the reception of the first acknowledgement, code for causing the UE to abort an ongoing random access channel (RACH) procedure for transmitting the pending RLC ACK PDU.

25. The computer-readable storage medium of claim 22, wherein the reconfiguration message comprises a Physical Channel Reconfiguration message.

26. The computer-readable storage medium of claim 22, wherein the first RRC state is one of a Cell_DCH state, a Cell_PCH state, a Cell_FACH state, or a URA_DCH state, and the second RRC state is another one of the Cell_DCH state, Cell_PCH state, Cell_FACH state, or URA_DCH state.

27. The computer-readable storage medium of claim 22, wherein the reconfiguration complete message comprises a Physical Channel Reconfiguration Complete message.

* * * * *